(12) United States Patent
Adkins et al.

(10) Patent No.: US 8,396,832 B2
(45) Date of Patent: Mar. 12, 2013

(54) INDEPENDENT FILESET GENERATIONS IN A CLUSTERED REDIRECT-ON-WRITE FILESYSTEM

(75) Inventors: Janet E. Adkins, Austin, TX (US); Joon Chang, Austin, TX (US); David J. Craft, Wimberly, TX (US); Manoj N. Kumar, Austin, TX (US); Andrew N. Solomon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 12/963,068

(22) Filed: Dec. 8, 2010

(65) Prior Publication Data
US 2012/0150800 A1  Jun. 14, 2012

(51) Int. Cl.
*G06F 17/30* (2006.01)
(52) U.S. Cl. .......... 707/638; 966/971; 966/972
(58) Field of Classification Search ........ 707/638, 707/966, 971, 972
See application file for complete search history.

(56) References Cited

U.S. PATENT DOCUMENTS

| | | | |
|---|---|---|---|
| 5,819,292 A | 10/1998 | Hitz et al. | |
| 6,085,197 A | 7/2000 | Federighi et al. | |
| 6,233,105 B1 | 5/2001 | Chen et al. | |
| 6,237,001 B1 | 5/2001 | Bamford et al. | |
| 6,529,913 B1 | 3/2003 | Doig et al. | |
| 6,560,601 B1 | 5/2003 | Bjornerstedt | |
| 6,779,093 B1 | 8/2004 | Gupta | |
| 7,028,083 B2 | 4/2006 | Levine et al. | |
| 7,111,021 B1 | 9/2006 | Lewis et al. | |
| 7,418,463 B2 | 8/2008 | Verma et al. | |
| 7,437,360 B1 | 10/2008 | Chitre et al. | |
| 7,467,265 B1 | 12/2008 | Tawri et al. | |
| 7,472,129 B2 | 12/2008 | Adya et al. | |
| 7,526,668 B2 | 4/2009 | Shitomi et al. | |
| 7,599,941 B2 | 10/2009 | Bahar | |
| 7,610,329 B2 * | 10/2009 | Bone et al. ............ | 709/201 |
| 7,617,217 B1 | 11/2009 | Chen et al. | |
| 7,640,274 B2 | 12/2009 | Tinker et al. | |
| 7,640,278 B2 | 12/2009 | Lashley et al. | |
| 7,698,289 B2 | 4/2010 | Kazar et al. | |
| 7,734,669 B2 | 6/2010 | Kottomtharayil et al. | |
| 7,747,584 B1 | 6/2010 | Jernigan, IV | |
| 7,814,118 B2 | 10/2010 | Kottomtharayil et al. | |
| 7,827,350 B1 * | 11/2010 | Jiang et al. ............ | 711/114 |
| 7,840,537 B2 | 11/2010 | Gokhale et al. | |
| 7,953,706 B2 | 5/2011 | Prahlad et al. | |
| 7,984,085 B1 | 7/2011 | Aggarwal et al. | |
| 8,095,511 B2 | 1/2012 | Zwilling et al. | |

(Continued)

FOREIGN PATENT DOCUMENTS
WO  2010042109  2/2010

OTHER PUBLICATIONS

"PCT Application No. PCT/EP2011/070938 International Search Report", May 10, 2012, 9 pages.

(Continued)

*Primary Examiner* — William Spieler
(74) *Attorney, Agent, or Firm* — DeLizio Gilliam, PLLC (57) ABSTRACT

Maintaining a generation value for each fileset that is distinct from a corresponding fileset manager preserves the independence of nodes while also allowing distributed fileset management. A fileset manager can maintain a value that reflects consistency snapshots for that node ("node generation") separately from a value that reflects consistency snapshots for a particular fileset ("fileset generation").

25 Claims, 4 Drawing Sheets

U.S. PATENT DOCUMENTS

| | | | |
|---|---|---|---|
| 2003/0069902 A1* | 4/2003 | Narang et al. | 707/203 |
| 2004/0139125 A1* | 7/2004 | Strassburg et al. | 707/202 |
| 2007/0061539 A1* | 3/2007 | Nonaka et al. | 711/170 |
| 2007/0179991 A1* | 8/2007 | Burnett et al. | 707/201 |
| 2008/0005196 A1* | 1/2008 | Beck | 707/203 |
| 2008/0256138 A1 | 10/2008 | Sim-Tang | |
| 2009/0006486 A1* | 1/2009 | Burnett et al. | 707/200 |
| 2009/0240744 A1 | 9/2009 | Thomson et al. | |
| 2009/0327798 A1 | 12/2009 | D'Amato et al. | |
| 2010/0125751 A1 | 5/2010 | McKean | |
| 2011/0178972 A1 | 7/2011 | Navarro et al. | |
| 2011/0238936 A1 | 9/2011 | Hayden | |
| 2012/0030265 A1 | 2/2012 | Anderson et al. | |
| 2012/0150804 A1 | 6/2012 | Adkins et al. | |
| 2012/0150926 A1 | 6/2012 | Adkins et al. | |
| 2012/0151245 A1 | 6/2012 | Chang et al. | |
| 2012/0216074 A1 | 8/2012 | Chang et al. | |

OTHER PUBLICATIONS

Xiao, Weijun et al., "Design and Analysis of Block-Level Snapshots for Data Protection and Recovery", IEEE Transactions on Computers, vol. 58, No. 12 Dec. 2009, pp. 1615-1625.

Zhang, Chen et al., "Supporting Multi-row Distributed Transactions with Global Snapshot Isolation Using Bare-bones HBase", 11th IEEE/ACM International Conference on Grid Computing 2010, pp. 177-184.

U.S. Appl. No. 12/963,078, filed Dec. 8, 2010, Chang, Joon et al.

U.S. Appl. No. 12/963,146, filed Dec. 8, 2010, Adkins, Janet E., et al.

U.S. Appl. No. 12/963,166, filed Dec. 8, 2010, Adkins, Janet E., et al.

Cardellini, Valeria "Redirection Algorithms for Load Sharing in Distributed Web-Server Systems",*Proceedings 19th IEEE International Conference on Distributed Computing Systems* May 31-Jun. 4, 1999, 8 pages.

Ellenberg, Lars "DRBD 9 & Device-Mapper Linux Block Level Storage Replication", 2008-2009, 12 pages.

Lee, Edward K. "A Comparison of Two Distributed Disk Systems", *Technical Report 155, Systems Research Center, Digital Equipment Corporation* Sep. 27, 2001, 15 pages.

Mushran, Sunil "OCFS2-A Cluster File System for Linux-User's Guide for Release 1.4", Jul. 2008, 44 pages.

Panasas Inc., "Object Storage Architecture", *Panasas White Paper* Jan. 25, 2005, 24 pages.

Shvachko, Konstantin "The Hadoop Distributed File System", *Google/IEEE* 2010, 10 pages.

Symantec, "The VERITAS Cluster File System: Technology and Usage", ISBN 0-321-446100 2010, 252 pages.

Ungureanu, Cristian "HydraFS: a High-Throughput File System for the HYDRAstor Content-Addressable Storage System", *NEC Laboratories America* 2009-2010, 14 pages.

Weil, Sage A. "Ceph: A Scalable, High-Performance Distributed File System", http://www.ssrc.ucsc.edu/Papers/weil-osdi06.pdf (Obtained from the Internet on Jan. 4, 2011) Nov. 2006, 14 pages.

Weil, Sage "RADOS: A Scalable, Reliable Storage Service for Petabyte-Scale Storage Clusters", 2008-2009, 24 pages.

Whitaker, Christopher "Design of the Server for the Spiralog File System", *Digital Technical Journal*, vol. 8, No. 2, 1996, pp. 15-31.

"U.S. Appl. No. 12/963,146 Office Action", Mar. 5, 2012, 17 pages.

"U.S. Appl. No. 12/963,166 Office Action", May 17, 2012, 14 pages.

U.S. Appl. No. 13/458,796, filed Apr. 27, 2012, Chang, Joon et al.

Cluster File Systems, Inc., "Lustre: A Scalable, High-Performance File System", Nov. 11, 2002, 13 pages.

Hewlett-Packard, "Veritas Storage Foundation 4.1 Release Notes", *Google* Sep. 2005, 58 pages.

Suk, Jinsun et al., "Snapshot-Based Data Backup Scheme: Open ROW Snapshot", *Lecture Notes in Computer Science*, vol. 5545 before INSPEC/Springer-Verlag, 2009, pp. 657-666.

Tewari, Renu et al., "IBM Research Report—Glamour: A Wide-Area File System Middleware Using NFSv4", *Google* 2005, 15 pages.

Veritas Software Corp, "Veritas Storage Foundation 4.0 Release Notes", Nov. 2006, 40 pages.

"U.S. Appl. No. 12/963,166 Final Office Action", Aug. 30, 2012, 34 pages.

"U.S. Appl. No. 12/963,146 Final Office Action", Aug. 13, 2012, 19 pages.

* cited by examiner

INDEPENDENT FILESET GENERATIONS IN A CLUSTERED REDIRECT-ON-WRITE FILESYSTEM

BACKGROUND

Embodiments of the inventive subject matter generally relate to the field of filesystems, and, more particularly, to clustered filesystems with redirect-on-write snapshotting.

SUMMARY

Embodiments include a method comprising tracking generations of a first node of a plurality of nodes in a cluster that are managing a plurality of filesets. The generations of the first node represent progression of consistency snapshots by the first node. Generations for each of the plurality of filesets in a distributed redirect-on-write clustered filesystem are independently tracked. Management of the plurality of filesets is distributed across the plurality of nodes in the cluster that hosts the distributed redirect-on-write clustered filesystem. The generations for each of the plurality of filesets represent progression of consistency snapshots of the plurality of filesets.

Embodiments include a method comprising maintaining a first fileset generation value for a first fileset of a plurality of filesets in memory of a first node of a plurality of nodes of a cluster. A second fileset generation value is maintained for a second fileset of the plurality of filesets independently of the first fileset generation value in the memory of the first node. Management of the first fileset and the second fileset has been delegated to the first node and the plurality of filesets are of a clustered redirect-on-write filesystem. A node generation value is maintained for the first node in the memory of the first node. The node generation value indicates a progression of consistency snapshots by the first node. The first fileset generation value represents a progression of consistency snapshots that have included the first fileset. The second fileset generation value represents a progression of consistency snapshots that have included the second fileset. The first fileset generation value and the second fileset generation value are stored into persistent cluster storage incident with publishing first metadata of the first fileset and second metadata of the second fileset.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

A cluster is formed from multiple computer systems or nodes and resources, including persistent storage resources. A clustered file system is implemented across the storage resources of a cluster. The cluster storage resources are coupled to allow direct access by the nodes of the cluster. The storage resources can be directly cabled to the nodes and/or accessible via a network (e.g., storage area network).

When a cluster is established, an administrator configures one of the nodes of the cluster to operate as a cluster leader. Embodiments can also program a cluster to a automatically choose the leader. The cluster leader maintains cluster role data that indicates whether a node is operating as a client, as a server, or as both a client and a server. A node operating as a server manages a fileset in the clustered filesystem. A node operating as a server in a cluster is also referred to herein as a fileset manager. In addition to the indications of which nodes are operating as servers within the cluster, the cluster leader can also maintain an indication of which filesets are managed by which servers. The cluster leader also maintains an indication of which node operates as a clustered file system manager. A node within a cluster can be configured to operate as the cluster leader and the clustered file system manager. Whether a node operates as a cluster leader, server, client, etc., can be transparent to users of the cluster. A user will perceive a same behavior whether a node operates as both the client and server, or the client is on a remote node.

The clustered file system manager manages metadata for the clustered file system. The clustered file system manager maintains the clustered file system metadata ("metadata") in a hierarchical data structure. Elements of the hierarchical structure can comprise inodes. The clustered filesystem metadata comprises metadata for filesets and files. A fileset comprises a set of files. A fileset can also comprise one or more filesets. In the hierarchical data structure, a fileset can be nested within a fileset to reflect a fileset comprising another fileset.

The clustered file system manager maintains a root for the clustered filesystem metadata at a known location (e.g., predefined location) in the persistent cluster storage resources ("cluster storage"). In a cluster that implements redirect-on-write consistency snapshots, multiple locations in the cluster storage are reserved or defined for storing roots of consistency snapshots along with root metadata of the corresponding consistency snapshots. The root metadata helps to identify the consistency snapshots and to ensure integrity of the consistent snapshots. Embodiments can use a time-based identifier of consistency snapshots (e.g., generation value) and root checksums. Embodiments can write a first root checksum ("header checksum") when a node begins to write the root and a second root checksum ("trailer checksum") after the root has successfully been written to persistent cluster storage. Embodiments can use the header checksum and trailer checksum to ensure writing of the root of a consistency snapshot was not interrupted. To recover from a failure, the node examines each of the locations and selects the location with the most recent generation value to allow recovery to begin with that consistency snapshot. Furthermore, progression of consistency snapshots ("generations") can be tracked with generation values that allow for snapshots of different times for a filesystem object (e.g., fileset) to be distinguishable. A cluster can be configured to preserve a certain number of consistency snapshots.

An efficient cluster allows clients to perform writes to filesets of the clustered filesystem. In a redirect-on-write clustered filesystem, the client writes are to cluster storage. Allowing clients to write to the cluster storage provides independence among the nodes within the cluster, and avoids congestion at a server. A clustered filesystem can distribute fileset management for further operational efficiency in the cluster. In this case, the clustered file system manager delegates management of filesets within the clustered file system to other nodes of the cluster. When a node operating solely as a client is delegated management of a fileset, the delegation is referred to herein as promotion from client to server. The clustered filesystem manager can delegate management of a fileset from itself to another node, and can re-delegate fileset management among the other nodes.

In a redirect-on-write clustered filesystem that distributes fileset management, consistency snapshots could be synchronized across fileset managers. Synchronizing consistency snapshots across the fileset managers, however, exposes the cluster to individual node failures. Moreover, synchronizing consistency snapshots across fileset managers impedes the snapshot process with the slowest performing fileset manager. Maintaining a generation value for each fileset that is distinct from a corresponding fileset manager preserves the independence of nodes while also allowing distributed fileset management. A fileset manager can maintain a value that reflects consistency snapshots for that node ("node generation") separately from a value that reflects consistency snapshots for a particular fileset ("fileset generation").

Figure 1:
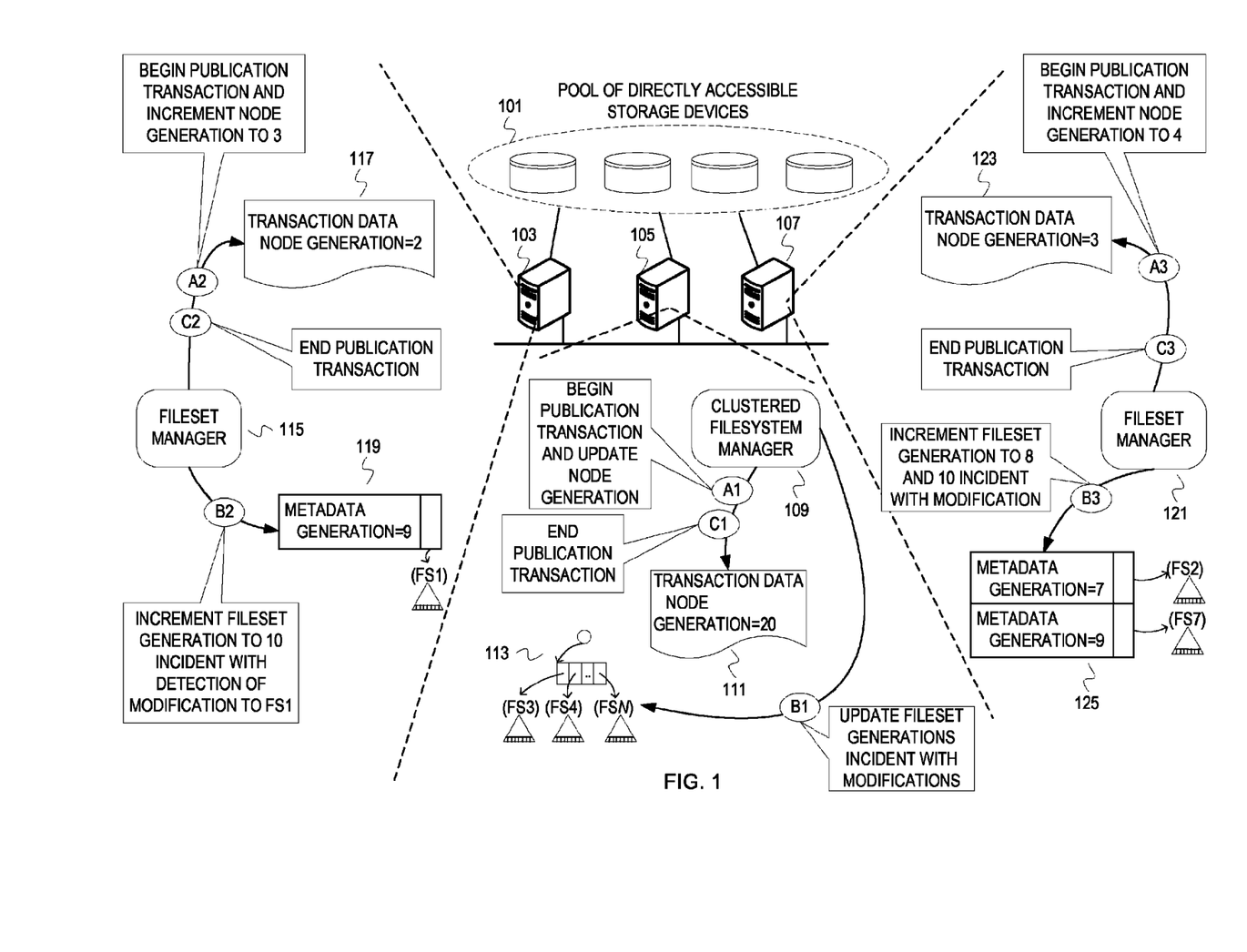
FIG. 1 depicts a conceptual diagram of an example redirect-on-write clustered filesystem tracking fileset generations and node generations.

FIG. 1 depicts a conceptual diagram of an example redirect-on-write clustered filesystem tracking fileset generations and node generations. The example cluster comprises node 103, node 105, and node 107. The nodes can be any of a variety of computers or computing systems. The nodes are coupled with a pool 101 of directly accessible storage devices. The storage devices that constitute pool 101 can be accessible via a network (e.g., storage area network) and/or via cables directly coupling the storage devices to nodes 103, 105, 107. Node 105 is depicted as hosting clustered filesystem manager 109. In FIG. 1, clustered filesystem manager 109 represents an executing instance of a computer program or part of a computer program. Node 107 is depicted as hosting fileset manager 121, and node 103 is depicted as hosting fileset manager 115. Fileset managers 115, 121 represent executing instances of computer programs or parts of computer programs. Embodiments, however, can implement the functionality of a fileset manager or a clustered filesystem manager partially or wholly within hardware.

Figure 2:
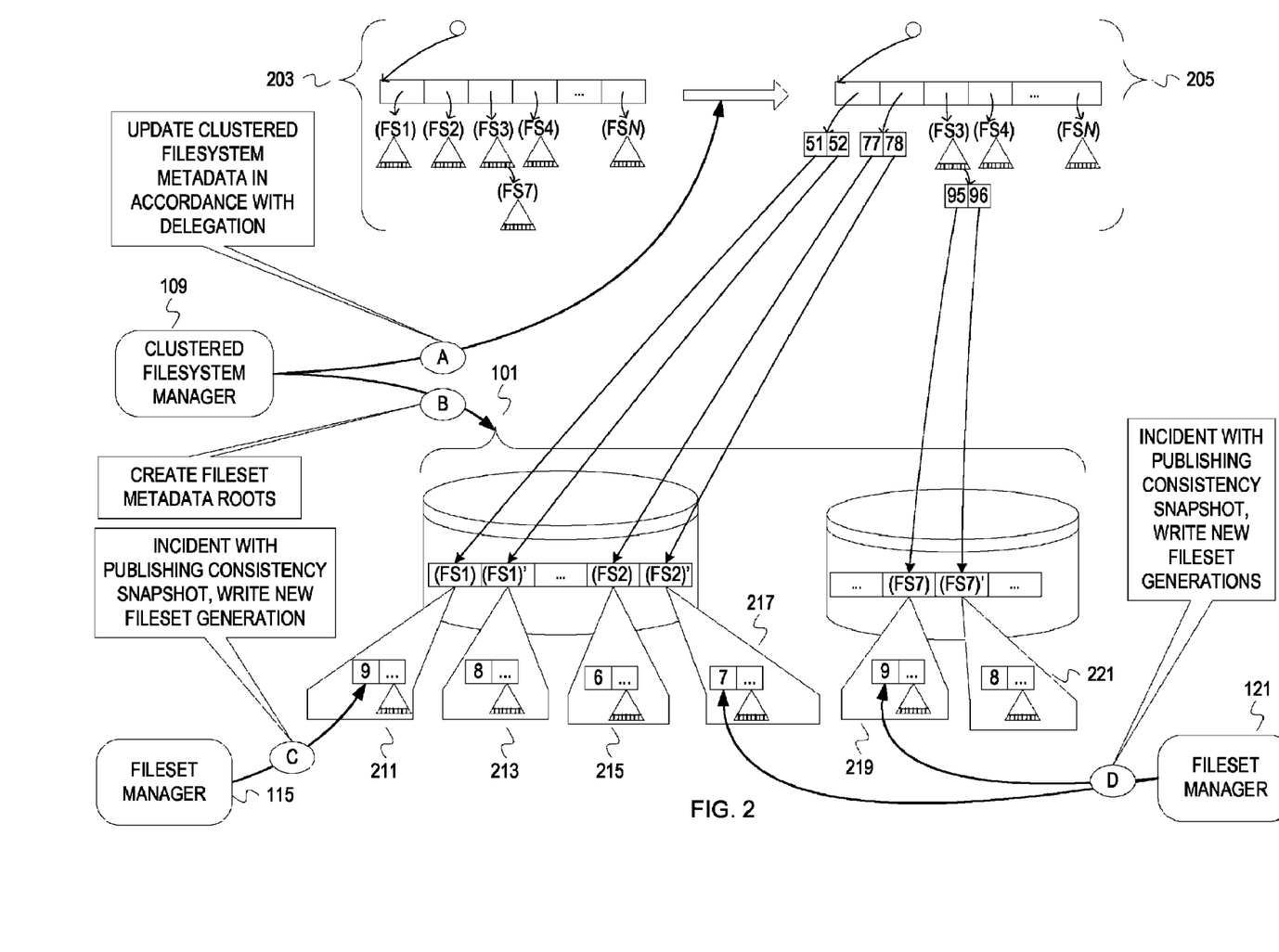
FIG. 2 depicts an example conceptual diagram of metadata updates corresponding to fileset management delegation and consistency snapshot publication.

In this example illustration, nodes 103, 107 have already been promoted to server or fileset manager by node 105. Clustered filesystem manager 109 has already delegated management of a fileset FS1 to node 103. Clustered filesystem manager 109 has also already delegated management of filesets FS2 and FS7 to node 107. Clustered filesystem manager 109 remains responsible for filesets FS3-FSN as reflected by hierarchical clustered filesystem metadata 113. Hierarchical clustered filesystem metadata 113 is depicted with a root referencing an array of pointers to roots of extent trees in FIG. 1. The extent trees are depicted as triangles. An extent tree refers to a collection of data structures that correspond to a fileset and a fileset(s) and/or file(s) within the fileset. For example, an extent tree can represent a fileset inode, and other inodes referenced by the fileset inode. The other inodes can be other fileset inodes and file inodes. The term "tree" is used for naming simplicity and should not be used to limit embodiments and/or scope of the claims. A variety of data structures can be used to store metadata for files and/or filesets. Reference is made to FIG. 2 to illustrate example operations that occur when delegating fileset management.

FIG. 2 depicts an example conceptual diagram of metadata updates corresponding to fileset management delegation and consistency snapshot publication. Delegating management of filesets FS1, FS2, and FS7 comprises clustered filesystem manager 109 updating hierarchical clustered filesystem metadata 203 to reflect the delegation. Prior to the delegation, hierarchical clustered filesystem metadata 203 comprised metadata for filesets FS1-FSN, as well as metadata for filesets and files within those filesets (assuming no previous delegation). In FIG. 2, hierarchical clustered filesystem metadata 203 is depicted with a root referencing an array of pointers to roots of extent trees for the filesets FS1, FS2, FS3, FS4, and FSN. The extent tree corresponding to fileset FS3 references another extent tree corresponding to fileset FS7. The naming of the filesets have no significance and should not be interpreted as anything more than distinguishing filesets. In addition, the fileset FS7 is depicted as nested within fileset FS2 merely to depict a nested fileset. Filesets can be nested within the other filesets and no special relationship is intended by the depiction of nested FS7 other than depicting one of many variations in structure of hierarchical clustered filesystem metadata.

At a stage A, clustered filesystem manager 109 updates hierarchical clustered filesystem metadata 203 in accordance with delegation of filesets FS1, FS2, and FS7. When delegating the filesets, clustered filesystem manager 109 writes the extent tree for each of the delegated filesets to new locations in cluster storage. In FIG. 2, clustered filesystem manager 109 writes roots of those extent trees ("fileset metadata roots") into cluster storage of pool 101 at stage B. After each of the extent trees have been written to new locations, clustered filesystem manager 109 writes location of the fileset metadata roots to reserved or predefined locations in cluster storage. Embodiments are not limited to using cluster storage locations reserved or predefined for fileset metadata roots. Embodiments can write locations of fileset metadata roots to a database, directory, etc., which persists. After writing the extent trees to new locations and writing the fileset metadata roots, clustered filesystem manager 109 updates hierarchical clustered filesystem metadata 203. The update results in hierarchical clustered filesystem metadata 205, which corresponds to hierarchical clustered filesystem metadata 113 of FIG. 1.

To update hierarchical clustered filesystem metadata 203, in this illustration, clustered filesystem manager 109 removes the extent trees for the filesets FS1, FS2 and FS7. Clustered filesystem manager 109 replaces the extent trees with pointers in cluster storage where the fileset metadata roots will be maintained by corresponding fileset managers. In this illustration, clustered filesystem manager 109 replaces the extent trees with two pointers. Clustered filesystem manager 109 uses two pointers to allow a fileset manager to alternate writing its fileset metadata root(s). With at least two pointers, a consistency snapshot survives with a consistent view of the fileset or filesets managed by a fileset manager that fails while publishing a consistency snapshot to cluster storage. The extent tree for fileset FS1 has been replaced with a pointer "51" and a pointer "52." These pointers identify locations or logical blocks in cluster storage. After a fileset manager failure, a succeeding fileset manager or clustered filesystem manager 109 reads both locations and uses the fileset metadata root with a most recent generation value. The extent tree for fileset FS2 has been replaced with pointers "77" and "78." The extent tree for fileset FS7 has been replaced with pointers "95" and "96." Again, the block numbers selected are merely for illustration. Embodiments are not limited to using adjacent blocks for alternate fileset metadata roots, and are not limited to separating fileset metadata roots of different fileset managers. After the metadata update has completed, clustered filesystem manager 109 can publish hierarchical clustered filesystem metadata 205 to cluster storage or wait until a consistency snapshot interval is reached. Clustered filesystem manager 109 informs the fileset managers of the location of their fileset metadata roots.

In FIG. 2, each of the locations in pool 101 are annotated to indicate the two fileset metadata roots for a fileset manager. Locations "51" and "52" for FS1 are respectively annotated in blocks of pool 101 as "(FS1)" and "(FS1)'". Locations "77" and "78" for FS2 are respectively annotated in blocks of pool 101 as "(FS2)" and "(FS2)'". Locations "95" and "96" for FS7 are respectively annotated in blocks of pool 101 as "(FS7)" and "(FS7)'".

Returning to FIG. 1, operations are depicted with various stages at each of nodes 103, 105, 107. The operations at node 105 are labeled as stages A1-C1. The operations at node 103 are labeled as stages A2-C2. The operations at node 107 are labeled as stages A3-C3. The stage labels are used to illustrate parallelism that is not necessarily concurrent. Each of nodes 103, 105, 107 perform similar operations for publishing a consistency snapshot that involves transactional bookkeeping and snapshot bookkeeping. The transactional bookkeeping includes maintaining a node generation value relevant to the particular node. The snapshot bookkeeping includes maintaining a fileset generation value relevant to the particular fileset. Although each of nodes 103, 105, 107 is subject to a snapshot interval defined for the cluster, differences among nodes 103, 105, 107 can lead to variations when the snapshot interval is reached.

At stage A1, clustered filesystem manager 109 begins a publication transaction and updates a node generation value from 20 to 21 in a transactional data structure 111. The node generation value can be used to distinguish between operations of a transaction that occur in different consistency snapshot intervals. To preserve consistency, the cluster employs transactional barriers or transactions to ensure atomicity of operations that constitute a transaction. For instance, if publication is interrupted, then the publication transaction is not complete. If the publication transaction is incomplete, then the operations that have been performed for the incomplete transaction are considered as not having been done. A log can be written to persistent storage after each operation of a transaction to allow a succeeding server (fileset manager or clustered filesystem manager) to at least partially recover operations of an incomplete transaction. The node generation can be employed to distinguish between data or metadata of a current generation and of a preceding generation that is in the process of being published to cluster storage. For example, a fileset manager can be responsible for different filesets that are in different generations. The node generation can be employed to distinguish between a preceding generation and a current generation instead of maintaining several different generations for several different filesets.

At stage B1, clustered filesystem manager 109 updates fileset generations for filesets FS3-FSN in hierarchical clustered filesystem metadata 113. Clustered filesystem manager 109 will increment the fileset generations within the metadata of each of the filesets if a modification occurs to the filesets. For example, the generation value for fileset FS3 will be incremented to N+1 if a write occurs to fileset FS3 after node 105 begins publishing generation N of fileset FS3. Clustered filesystem manager 109 will publish hierarchical clustered filesystem metadata 113 in a bottom-up order. For instance, clustered filesystem manager 109 will start writing metadata for files and end with metadata of the topmost filesets. After the publishing has successfully completed, clustered filesystem manager 109 ends the publication transaction at stage C1.

Fileset manager 115 performs similar operations when it arrives at the snapshot consistency interval. At stage A2, fileset manager 115 begins a publication transaction and updates a node generation value from 2 to 3 in a transactional data structure 117. At stage B2, fileset manager 115 increments the fileset generation for fileset FS1 from 9 to 10 in hierarchical fileset manager metadata 119 in memory, assuming a write occurs to FS1 after node 103 begins publishing the snapshot for generation 9 of fileset FS1. Hierarchical fileset manager metadata 119 comprises metadata for fileset FS1 and the extent tree for fileset FS1. The metadata for fileset FS1 comprises the generation value. After the publishing has successfully completed, fileset manager 115 ends the publication transaction at stage C2.

Referring to FIG. 2, fileset manager 115 writes the generation value of 9 into fileset metadata 211 for fileset FS1 at location "51" in pool 101 incident with publishing the consistency snapshot of hierarchical fileset manager metadata 119. Since the clustered filesystem implements redirect-on-write, fileset metadata is always written to a different location. But the fileset metadata root is bound to one of two locations in this illustrated example. Hence, the "new" location will alternate between the two locations specified for the fileset metadata root. FIG. 2 depicts location "51" as comprising fileset metadata 211 that includes the new fileset generation value. Fileset metadata 211 is also depicted with an extent tree for contextual reference. The fileset metadata 211, 213, 215, 217, 219, 221 are not intended to depict a block as hosting fileset metadata and an extent tree. Fileset manager 115 selects location "51" for the new root of the generation 9 consistency snapshot because location "51" references fileset metadata with an older generation value than location the generation value of the fileset metadata referenced by location "52." Thus, the generation value of 9 will persist for fileset FS1. The location "52" is depicted as referencing fileset metadata 213 that includes generation value of 8, which is now a past snapshot.

Returning to FIG. 1, fileset manager 121 performs similar operations when it arrives at the snapshot consistency interval. But fileset manager 121 manages two filesets FS2 and FS7. At stage A3, fileset manager 121 begins a publication transaction and updates a node generation value from 3 to 4 in a transactional data structure 123. Nodes can have different node generation values for a variety of reasons (e.g., nodes can be promoted at different times, nodes may be taking over for a failed node, etc.). At stage B3, fileset manager 121 increments the fileset generation value for fileset FS2 from 7 to 8 responsive to detecting a write to FS2 after fileset manager 121 begins publishing the snapshot for generation 7 of FS1. And the fileset manager 121 increments the fileset generation value for fileset FS7 from 9 to 10 in in-memory hierarchical fileset manager metadata 125 responsive to detecting a write to FS7 after fileset manager 121 begins publishing the snapshot for generation 9 of FS7. Hierarchical fileset manager metadata 125 comprises metadata for fileset FS2 and the extent tree for fileset FS1 and for fileset FS7 and the extent tree for FS7. The metadata for fileset FS2 and the metadata for fileset FS7 comprise the respective generation values. After the publishing has successfully completed, fileset manager 121 ends the publication transaction at stage C3.

Referring again to FIG. 2, fileset manager 121 writes the new generation value of 7 into fileset metadata 217 for fileset FS2 at location "78" in pool 101 incident with publishing the consistency snapshot of hierarchical fileset manager metadata 125. Fileset manager 121 also writes the new generation value of 9 into fileset metadata 219 for fileset FS7 at location "95" in pool 101 incident with publishing the consistency snapshot of hierarchical fileset manager metadata 125. As with fileset FS1, the generation values of 9 and 7 will persist for fileset FS7 and FS2, respectively. The location "77" is depicted as referencing fileset metadata 215 that includes generation value of 6, which is now a past snapshot. The location "96" is depicted as referencing fileset metadata 221 that includes generation value of 8, which is now a past snapshot. As with the block numbers, no special significance should be ascribed to the layout of the fileset metadata roots and to depiction of (FS1)', (FS2)', and (FS7)' referencing past snapshots.

Different generation values can arise for different filesets for various reasons. Filesets can be created at different times. Filesets can be more active. For instance, a generation can be skipped for a fileset that does not have any changes during a snapshot interval. In addition, a generation can be skipped if publication of a preceding snapshot did not complete within a snapshot interval. A node can take over management of a fileset because of a node failure or because of reassignment or re-delegation by the clustered filesystem manager (e.g., from load balancing, from a change in accessing patterns, etc.). Since a persistent generation value is maintained for the fileset, consistency of snapshots can be preserved without sacrificing independence of nodes. In addition, persistent fileset generation values allows publication of a fileset snapshot independent of other filesets managed at a same node. For instance, fileset manager 121 can successfully publish the metadata for fileset FS7, and suffer a failure before completing publication of the metadata for fileset FS2. Even though the generation of the fileset manager was interrupted, the generation of the fileset FS7 can persist. Clustered filesystem manager 109 can delegate management of fileset FS2 to node 103. In that case, fileset manager 115 will determine that location "78" has a most recent generation value since stage D of FIG. 2 did not occur. And fileset manager 115 will load the fileset metadata 217, and corresponding extent tree. Regardless of the failure at node 107, fileset manager 115 proceeds with generation 7 for FS2.

Figure 3:
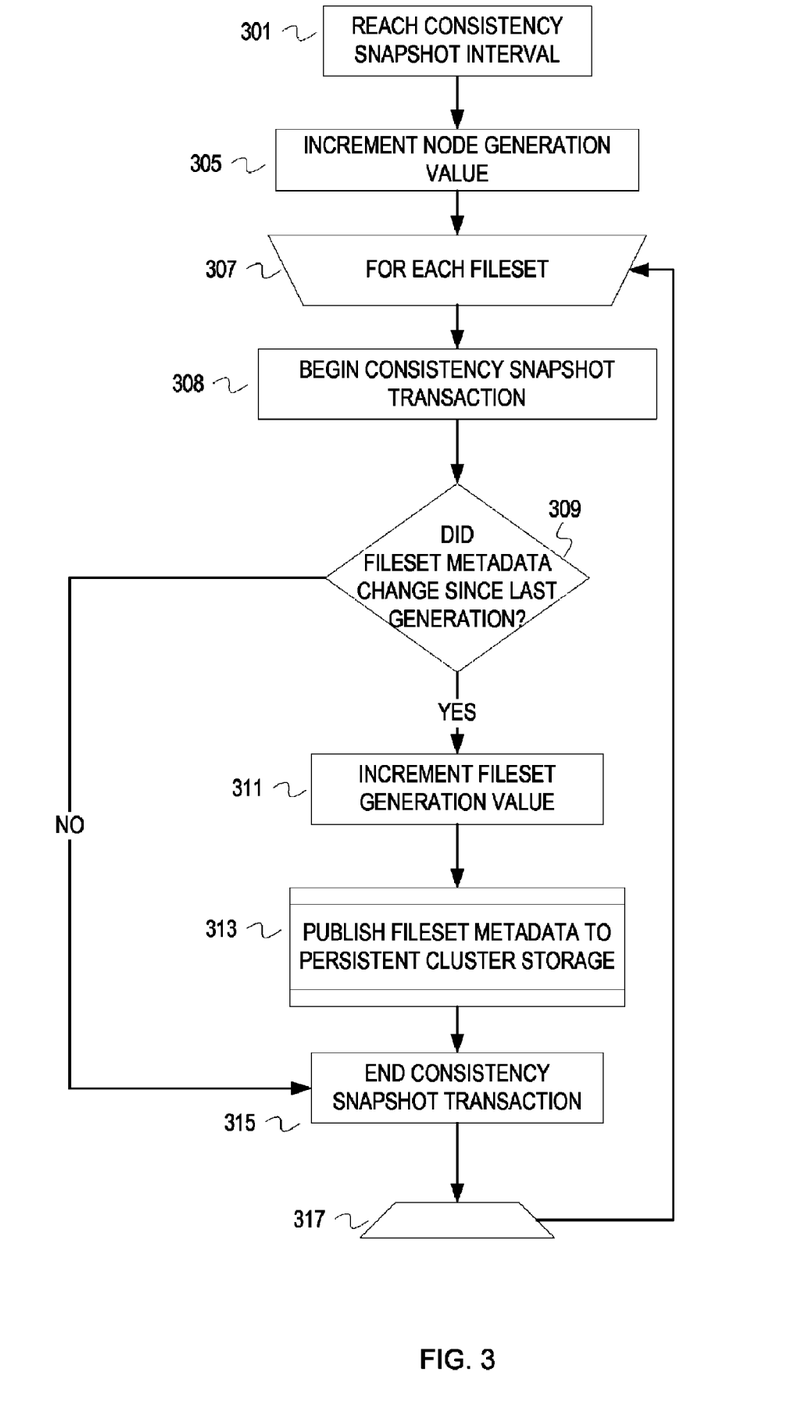
FIG. 3 depicts a flowchart of example operations for maintaining a fileset generation value and a node generation value.

FIG. 3 depicts a flowchart of example operations for maintaining a fileset generation value and a node generation value. At some point, a node reaches a consistency snapshot interval (301). Incident or responsive to reaching the consistency snapshot interval, a node generation value is incremented (305). For each fileset managed by the node (307), the node publishes the fileset metadata.

The node begins a consistency snapshot transaction on a per fileset basis (308). Embodiment can also begin a transaction when the interval is reached, in addition to or instead of the fileset based transaction. Embodiments can enforce atomicity of all operations across filesets managed by a node for a consistency snapshots. Embodiments can enforce atomicity for each fileset publication, and separately enforce atomicity of snapshot operations that do not directly relate to the filesets (e.g., publishing free block tracking data). For example, a fileset manager can also write to persistent cluster storage any of data used to track allocation of free blocks to clients, data used to track a transaction at the fileset manager, etc.

The node then determines whether fileset metadata has changed since the last generation (309). The node can use the node generation value to determine whether fileset metadata has changed. If the fileset metadata has not changed, then the consistency snapshot may be skipped, and the consistency snapshot transaction for that fileset ends (315).

If the fileset metadata has changed, then the node increments the in-memory fileset generation value for the fileset (311). The node then proceeds with operations to publish the fileset metadata from memory of the node to persistent cluster storage (313). After all of the fileset metadata has been written out to persistent cluster storage, the fileset metadata root is updated to reference the new location of the fileset metadata. After the fileset metadata root is updated, the consistency snapshot transaction ends (315). If the node manages another fileset, then the node processes the next fileset (317).

The depicted flowcharts are examples intended to aid in understanding the inventive subject matter, and should not be used to limit embodiments and/or the scope of the claims. Embodiments can perform the operations depicted in the flowcharts in a different order, can perform the depicted operations in parallel, can perform additional operations, can perform fewer operations, etc. Referring to FIG. 3, additional operations can be performed for logging operations as a transaction progresses.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
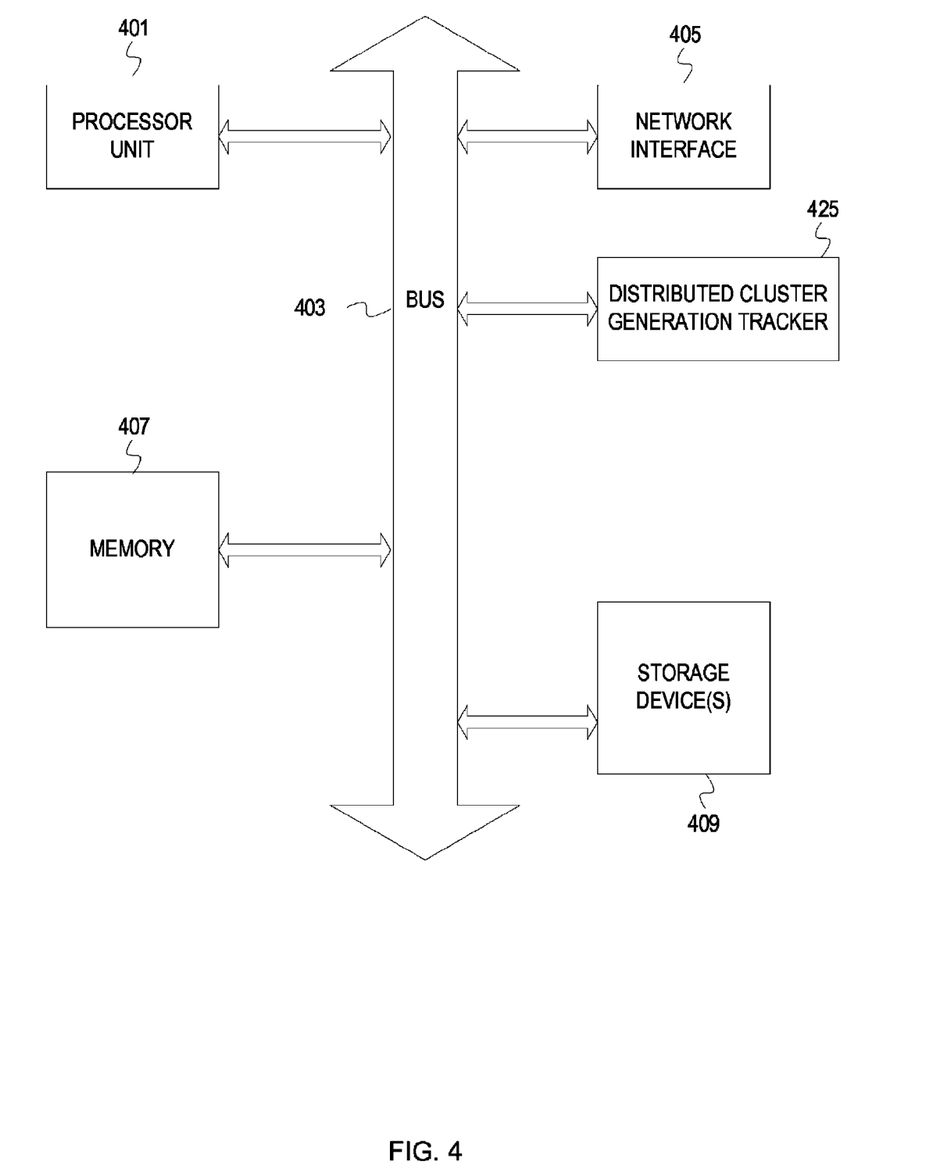
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). Distributed cluster generation tracker 425 is also coupled with the bus 403. Distributed cluster generation tracker 425 maintains fileset generation values for each fileset managed by the computer system, and separately maintains a node generation value for the computer system. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for preserving independent fileset generation values across a distributed redirect-on-write clustered filesystem as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    tracking generations of a first node of a plurality of nodes in a cluster that hosts a distributed redirect-on-write clustered filesystem, wherein the plurality of nodes are managing a plurality of filesets in the distributed redirect-on-write clustered filesystem and wherein the generations of the first node represent progression of consistency snapshots by the first node; and
    independently tracking generations for each of the plurality of filesets in the distributed redirect-on-write clustered filesystem,
        wherein management of the plurality of filesets is distributed across the plurality of nodes in the cluster that hosts the distributed redirect-on-write clustered filesystem,
        wherein the generations for each of the plurality of filesets represent progression of consistency snapshots of the plurality of filesets.

2. The method of claim 1, wherein said tracking the generations of the first node comprises incrementing a node generation value incident with the first node reaching a consistency snapshot interval.

3. The method of claim 1, wherein the consistency snapshot comprises metadata for a first fileset of the plurality of filesets managed by the first node and data used for tracking free block allocation to a client of the first node in the cluster.

4. The method of claim 1, wherein said tracking generations for each of the plurality of filesets in the distributed redirect-on-write clustered filesystem comprises the first node incrementing a fileset generation value for a first fileset of the plurality of filesets managed by the first node incident with the first node detecting a modification to the first fileset after the first node begins publishing a consistency snapshot of the first fileset.

5. The method of claim 4, wherein said tracking generation for each of the plurality of filesets further comprises a second node of the plurality of nodes incrementing a second fileset generation value for a second fileset of the plurality of filesets managed by the second node incident with the second node detecting a modification to the second fileset after the second node begins publishing a consistency snapshot of the second fileset.

6. The method of claim 4 further comprising the first node maintaining a second fileset generation value for the first fileset in persistent storage of the cluster, wherein the second fileset generation value represents a preceding published consistency snapshot.

7. The method of claim 4 further comprising writing the fileset generation value to a location in persistent storage of the cluster that hosts metadata of the first fileset.

8. The method of claim 7, wherein said writing the fileset generation value to the location in persistent storage of the cluster comprises overwriting an oldest generation consistency snapshot of the second fileset written to a first of a plurality of locations reserved for a root of the fileset metadata, wherein the first of the plurality of locations corresponds to the location.

9. A method comprising:
maintaining a first fileset generation value for a first fileset of a plurality of filesets in memory of a first node of a plurality of nodes of a cluster;
maintaining a second fileset generation value for a second fileset of the plurality of filesets independently of the first fileset generation value in the memory of the first node, wherein management of the first fileset and the second fileset has been delegated to the first node and the plurality of filesets are of a clustered redirect-on-write filesystem;
maintaining a node generation value for the first node in the memory of the first node,
wherein the node generation value indicates a progression of consistency snapshots by the first node,
wherein the first fileset generation value represents a progression of consistency snapshots for the first fileset,
wherein the second fileset generation value represents a progression of consistency snapshots for the second fileset; and
storing the first fileset generation value and the second fileset generation value into persistent cluster storage incident with publishing first metadata of the first fileset and second metadata of the second fileset.

10. The method of claim 9, wherein said maintaining the node generation value comprises incrementing the node generation value incident with the node reaching a snapshot interval, wherein maintaining the first fileset generation value and the second fileset generation value comprises incrementing the first fileset generation value and the second fileset generation value incident with the node detecting a modification to the first fileset and to the second fileset, respectively.

11. The method of claim 9 further comprising:
delegating management of the first fileset to a second node of the plurality of nodes;
loading the maintained first fileset generation value from persistent storage into memory of the second node; and
incrementing the first fileset generation value in memory of the second node incident with the second node reaching a consistency snapshot interval.

12. A computer program product for independently tracking generations of filesets in a distributed redirect-on-write clustered filesystem, the computer program product comprising:
a computer readable storage medium having computer usable program code embodied therewith, the computer usable program code executable by a node to cause the node to perform operations comprising:
tracking generations of the node, which is in a cluster comprised of a plurality of nodes that are managing a plurality of filesets in the distributed redirect-on-write clustered filesystem, wherein the generations of the node represent progression of consistency snapshots by the node; and
independently tracking generations for each of the plurality of filesets in the distributed redirect-on-write clustered filesystem,
wherein management of the plurality of filesets is distributed across the plurality of nodes in the cluster that hosts the distributed redirect-on-write clustered filesystem,
wherein the generations for each of the plurality of filesets represent progression of consistency snapshots of the plurality of filesets.

13. The computer program product of claim 12, wherein said tracking the generations of the node comprises incrementing a node generation value incident with the node reaching a consistency snapshot interval.

14. The computer program product of claim 12, wherein the consistency snapshot comprises metadata for a first fileset of the plurality of filesets managed by the node and data used for tracking free block allocation to a client of the node, wherein the cluster comprises the client.

15. The computer program product of claim 12, wherein said tracking generations for each of the plurality of filesets in the distributed redirect-on-write clustered filesystem comprises the node incrementing a fileset generation value for a first fileset of the plurality of filesets managed by the node incident with the node detecting a modification to the first fileset after the node begins publishing a consistency snapshot for the first fileset.

16. The computer program product of claim 15, wherein the operations further comprise maintaining a second fileset generation value for the first fileset in persistent storage of the cluster, wherein the second fileset generation value represents a preceding consistency snapshot.

17. The computer program product of claim 15, wherein the operations further comprise writing the fileset generation value to a location in persistent storage of the cluster that hosts metadata of the first fileset.

18. The computer program product of claim 17, wherein said writing the fileset generation value to the location in persistent storage of the cluster comprises overwriting an oldest of a plurality of locations reserved for a root of the fileset metadata, wherein the oldest of the plurality of locations corresponds to the location.

19. A node in a cluster comprising:
a processor;
a network interface operable to carry communications to and from other nodes of the cluster;
a distributed cluster generation tracker operable to,
  track generations of the node, wherein the cluster comprises a plurality of nodes that are managing a plurality of filesets in a distributed redirect-on-write clustered filesystem, wherein the generations of the node represent progression of consistency snapshots by the node; and
  independently track generations for each of the plurality of filesets in the distributed redirect-on-write clustered filesystem,
  wherein management of the plurality of filesets is distributed across the plurality of nodes in the cluster that hosts the distributed redirect-on-write clustered filesystem,
  wherein the generations for each of the plurality of filesets represent progression of consistency snapshots of the plurality of filesets.

20. The node of claim 19, wherein the distributed cluster generation tracker being operable to track the generations of the node comprises the distributed cluster generation tracker being operable to increment a node generation value incident with the node reaching a consistency snapshot interval.

21. The node of claim 19, wherein the consistency snapshot comprises metadata for a first fileset of the plurality of filesets managed by the node and data used for tracking free block allocation to a client of the node, wherein the cluster comprises the client.

22. The node of claim 19, wherein the distributed cluster generation tracker being operable to track generations for each of the plurality of filesets in the distributed redirect-on-write clustered filesystem comprises the distributed cluster generation tracker being operable to increment a fileset generation value for a first fileset of the plurality of filesets managed by the node incident with the node detecting a modification to the first fileset after the node begins publishing a consistency snapshot for the first fileset.

23. The node of claim 22, wherein the distributed cluster generation tracker is further operable to maintain a second fileset generation value for the first fileset in persistent storage of the cluster, wherein the second fileset generation value represents a preceding consistency snapshot.

24. The node of claim 22, wherein the distributed cluster generation tracker is further operable to write the fileset generation value to a location in persistent storage of the cluster that hosts metadata of the first fileset.

25. The node of claim 19 further comprising a computer-readable storage medium encoded with instructions to implement the distributed cluster generation tracker when the instructions are executed by the processor.

* * * * *